: 3,554,966
Patented Jan. 12, 1971

3,554,966
AMORPHOUS POLYAMIDES

Michael Edward Benet Jones and Isaac Goodman, Runcorn, England, assignors to Imperial Chemical Industries Limited, London, England, a corporation of Great Britain
No Drawing. Continuation of application Ser. No. 550,106, May 16, 1966. This application Jan. 7, 1970, Ser. No. 3,557
Claims priority, application Great Britain, May 21, 1965, 19,751/66
Int. Cl. C08g 20/20
U.S. Cl. 260—47
14 Claims

ABSTRACT OF THE DISCLOSURE

Amorphous or at most only weakly crystalline, melt-fabricatable aromatic polyamides prepared by polycondensation of specific aromatic diamines in which the amino groups are on nonadjacent carbon atoms and aromatic dicarboxylic acids. Representative diamines are 4,4'-diaminodiphenyl ether, m-phenylene diamine and 4,4'-diaminodiphenyl sulphoxide while examples of the acids include the mono- and poly- alkoxy derivatives of iso-phthalic and terephthalic acids, dicarboxydiphenyl ethers, bis(carboxyphenoxy)alkanes and bis(carboxyphenoxy)-benzenes.

---

This application is a continuation of application Ser. No. 550,106 filed May 16, 1966, and now abandoned.

This invention relates to synthetic, essentially linear condensation polymers. More particularly it relates to polymers prepared from aromatic monomers in which the functional groups are directly attached to aromatic carbon atoms, and to their preparation.

It is known that diamines or certain derivatives thereof, e.g. their salts, may be reacted with dibasic acids or certain derivatives thereof, e.g. their acid halides, to form polyamides. Depending upon their structures, the aliphatic polyamides are generally crystalline materials of high melting point or amorphous materials of relatively low softening point. While the former have found wide use as film- and fibre-forming materials and as mouldable thermoplastics, the latter are generally too low softening and too susceptible to thermal and chemical attack to be of use for this purpose. Crystalline aromatic polyamides of high melting point have also been described and are said to be temperature-resistant and inert to a wide range of chemicals. However, while films and fibres may be formed from their solutions, their very high melting points (generally above 300° C.) preclude their use for moulding in conventional thermoplastic moulding equipment such as injection- or compression-moulding machinery or extruders. This is because under the very forcing conditions required to obtain them in a sufficiently mobile state, the polymers may decompose and at least will suffer thermal or oxidative degradation, which may be severe in some cases.

It would be desirable to produce polyamides having the attractive chemical and thermal stability of the crystalline aromatic polyamides described and yet having the ability to be moulded or extruded on conventional thermoplastic shaping machinery without concomitant decomposition or thermal or oxidative degradation.

We have now found that by careful selection of the diacids and diamines, wholly or substantially aromatic polyamides may be obtained which are amorphous in character or are at most only weakly crystalline. These polyamides substantially retain the excellent thermal and chemical resistance of highly crystalline aromatic polyamides and yet may be moulded or extruded or otherwise worked in a mobile form using conventional thermoplastic shaping equipment under conditions at which degradation or decomposition may be avoided.

It has generally been assumed that symmetry and periodicity of chemical structure in the component units are sufficient criteria for the display of crystalline character in polymeric materials, and conversely that the absence of these characteristics leads to the production of amorphous materials. However, these assumptions cannot be extended with success to aromatic polyamides because on the one hand certain polyamides having symmetrical and regularly recurring structural units have been found to be amorphous and on the other hand it is well known that crystallinity can occur in polyamide structures lacking both structural symmetry and periodicity.

Our amorphous or at most only weakly crystalline polymers may be recognised by the absence in particular of the property of undergoing on heating a first order phase transformation of melting from the solid crystalline condition to the wholly liquid state. In some cases, they may be recognised in addition by their incapacity to diffract X-rays discretely and/or their inability to exhibit bire-fringence in the solid state.

According to the present invention, our amorphous or at most only weakly crystalline aromatic polyamides are formed of macromolecular chains consisting essentially of aromatic diamide units derived from:

(i) at least one diprimary or disecondary diamine which is free of atoms or groups which would prevent successful polycondensation, in which the amino groups are situated on nonadjacent carbon atoms, and which is selected from the group consisting of:

(a) compounds containing a single aromatic six-membered carbocyclic ring carrying two amino groups attached meta to each other, (b) compounds containing two aromatic six-membered carbocyclic rings each carrying an amino group linked directly to a carbon atom of the ring and linked together by a divalent atom or group other than —SO$_2$— which is chosen such that the two aromatic six-membered carbocyclic rings are not co-linear and not co-planar and (c) diamino derivatives of fused aromatic polycyclic compounds (ii) at least one dicarboxylic acid which is free of atoms or groups which would prevent successful polycondensation and is selected from the group consisting of:

(a) compounds containing a single aromatic six-membered carbocyclic ring carrying two carboxylic acid (—COOH) groups on non-adjacent ring carbon atoms and, on at least one further atom of the carbocyclic ring, a group having the structure —OR, where R is a monovalent saturated by hydrocarbon group or a substituted derivative thereof, and (b) compounds containing two aromatic six-membered carbocyclic rings which are linked together by a divalent atom or group selected from —O—, and residues of diols, and in each of which a —COOH group is linked directly to one carbon atom of the ring and each of the remaining 4 carbon atoms of each ring carries a hydrogen atom, halogen atom or monovalent group having the structure —R, —OR or —SR where R has the meaning ascribed above.

While in the formation of aromatic polyamides selection of the diamines and diacids from the above categories will generally yield amorphous products, we have found a few combinations which unexpectedly yield crystalline or crystallisable materials and these are excluded from out invention. They consist of (i) the combination of m-phenylene diamine as the sole diamine with 4,4'-dicarboxydiphenyl ether as the sole diacid, (ii) the combination of any diamine having the structure:

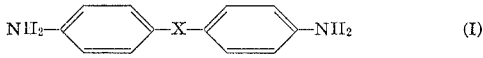

as the sole diamine with a diacid of the structure:

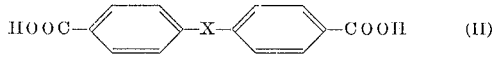

as the sole diacid when X is the diacid and the diamine is the same divalent atom or group, and (iii) the combination of a mixture of m-phenylene diamine and a diamine of the structure I with a diacid of the structure II where X represents the same divalent atom or group in both structure I and structure II. It will be understood of course that replacement of part of the diamine or diacid in these combination by other diamines or diacids within our defined groups will lead to amorphous products and that such modified polyamides are included in our invention.

The polyamides of our invention are normally solids at room temperatures and generally have reduced viscosities (measured on solutions of 1 gm. of the polymer in 100 cc. of 98% sulphuric acid at 25° C.) of at least 0.2. However, those polymers which have a useful combination of strength, chemical inertness and high softening point and find ready application as thermoplastic moulding materials have reduced viscosities of at least 0.3 and generally from 0.5 to 2.0.

Reduced viscosity is defined as $$\frac{t_1 - t_0}{t_0 \cdot c}$$

where $t_1$ is the flow time of the solution of the polymer in a suitable solvent in a viscometric test, $t_0$ is the flow time of the solvent alone under identical conditions and $c$ is the concentration of the solution calculated as grams of polymer per 100 ccs. of solvent.

THE DIACIDS

In the diacids from which our polyamides are formed, R may be any saturated hydrocarbon group, for example alkyl, aryl, aralkyl or alkaryl, where alk(yl) includes cycloalk(yl). Examples are methyl, ethyl, n-propyl, isopropyl, n-butyl, isobutyl, t-butyl, isomeric amyls, n-hexyl, n-heptyl, n-octyl, 2-ethyl hexyl, n-decyl, n-octadecyl, eicosyl, phenyl, α-naphthyl, β-naphthyl, benzyl, β-phenylethyl, tolyl, xylyl, cyclopentyl, cyclohexyl, 4-methylcyclohexyl and cyclooctyl. We prefer R in all cases to be an aryl or alkyl group containing up to 6 carbon atoms because of the generally high glass transition temperatures thereby obtained in the resulting amorphous polyamides. Examples are methyl, ethyl, propyl, isopropyl, butyl, amyl, hexyl and phenyl.

Our preferred acids of kind (a) are mono- (particularly), di-, tri- and tetra-alkoxy or phenoxy substituted terephthalic acids and mono- (particularly), di-, tri- and tetra-alkoxy or phenoxy substituted isophthalic acids.

The acids of kind ii(b) are dicarboxydiphenyl ethers, or aromatic dicarboxylic acids comprising two aromatic carbocyclic six-membered ring each containing a carboxylic acid group and linked by a diol residue having the structure —(OK)$_n$O— where K may be, for example, a divalent hydrocarbon radical (e.g. alkylene or phenylene) or a radical of the structure:

(where L is a direct linkage or —O—, —S—, —SO—, —SO$_2$—, —CO— or a divalent hydrocarbon residue, particularly wherein there is only one carbon atom linking the two phenyl groups; e.g. as in diphenylmethane or 2,2-bis(phenyl)propane) or a polymethylene chain having oxygen and/or sulphur atoms interposed between the carbon atoms, e.g. as in —CH$_2$CH$_2$OCH$_2$CH$_2$—, and $n$ is a whole number, generally 1 or 2.

The much preferred acids of kind (b) are the dicarboxydiphenyl ethers, since they may be derived readily from cresols. Others that may be mentioned are the di(carboxyphenoxy) alkanes and di(carboxyphenoxy) benzenes.

It will be understood that while we prefer to use aromatic dicarboxylic acids wherein apart from the linking atom or group in the bisphenyl compounds only —COOH groups and hydrogen atoms are linked to the carbon atoms of the aromatic carbocyclic rings, substituted derivatives of these acids wherein one or more of the hydrogen atoms are replaced by halogen, R—, —OR or —SR, may also be used.

Where R is a substituted hydrocarbon group, the substituent or substituents must be such as not to prevent successful polycondensation (e.g. by causing intramolecular reaction or by forming a monomeric product with the amine). It is also preferred that the substituent or substituents are free of active hydrogen atoms since these may promote cross-linking and result in an undesirable insoluble, infusible material. Suitable substituents are halogen, —OR', —SR'—, —NO$_2$, —SO$_3$Na, —SO$_3$K or NR'R" where R' and R" are monovalent hydrocarbon radicals (preferably containing from 1 to 6 carbon atoms) or halogenated derivatives thereof or R' and R" together form a divalent radical which is such as not to prevent successful polycondensation.

Because of their readily availability and their ready reaction with the diamines to form polyamides having good physical properties, our much preferred acids are mono-alkoxyterephthalic acids, 2-, 4- and 5-alkoxyisophthalic acids, 4,4'-dicarboxydiphenyl ether, di(carboxyphenoxy)ethanes and di(carboxyphenoxy) benzenes.

THE DIAMINES

While any diamine falling within the groups i(a), i(b) and i(c) as defined above may be used to form the polyamides of our invention so long as they are free from substituents which are such as to prevent successful polycondensation, the preferred diamines are diprimary diamines having the structures IV and V.

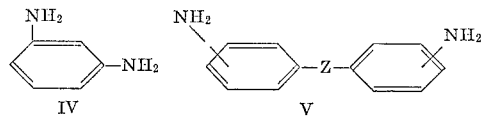

where, in structure V, Z is a bridging atom or group which is chosen such that the two benzenoid rings are not co-linear and not co-planar. Suitable bridging atoms or groups may be found by the expert in the art, for example by reference to molecular models, e.g. the Courtauld models. Examples are —O—, —S—, —SO—, —S—S—, —NR— (where R has the possibilities ascribed hereinbefore and is preferably a monovalent hydrocarbon group containing from 1 to 6 carbon atoms, or a halogenated derivative thereof) and

where each of the two free valencies of the carbon atoms is linked to a hydrogen atom or a carbon atom, for instance as in —CH$_2$—, —CH(CH$_3$)—, —C(CH$_3$)$_2$—, CH(C$_6$H$_5$)— and

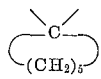

Derivatives of diamines having the structure IV and V may also be used where hydrogen atoms bound to the aromatic rings are replaced by monovalent substituents which are such as not to prevent successful polycondensation and preferably such as not to cause cross-linking. Suitable substituents are halogen atoms, monovalent hydrocarbon groups and their halogenated derivatives and radicals having the structures —OR', —SR', —NO$_2$, —SO₃Na, —SO₃K and —NR'R'' where R' and R'' have the meanings and the preferments ascribed hereinbefore. Where such substituted diamines are used, it is preferred, but not essential, that the substitution is asymmetric.

Where chemically inert polyamides of good strength and high softening point are desired, we prefer to use diamines having the structures VI and VII

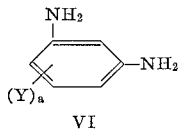
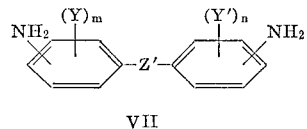

VI        VII where Y and Y' are each selected from halogen atoms and monovalent radicals having the structure —R', —OR' or —SR' where R' is a monovalent hydrocarbon radical or substituted derivative thereof; $a$, $m$ and $n$ are each selected from whole numbers of from 0 to 4 inclusive and are preferably zero and Z' is —O—, —S—, —SO—, or a divalent hydrocarbon radical having only one carbon atom in the chain between the benzene rings and preferably having not more than 10 carbon atoms in all. Economic considerations generally restrict R' to being an alkyl or aryl group containing not more than six carbon atoms.

Examples of diamines that may be used are m-phenylene diamine (bearing in mind the hereinbefore outlined restrictions placed on its use), 2,4-diaminotoluene, 3,5-diamino-o-xylene, 2,4-diaminochlorobenzene, 2,4-diaminobromobenzene, 2,4 - diaminoanisole, 1,5-diaminonaphthalene, diaminodiphenyl ethers, diaminodiphenyl sulphoxides, bis(aminophenyl)methanes, 2,2-bis(aminophenyl)propanes, diaminotriphenylmethanes, bis(2 - chloro-4-aminophenyl)ether and bis(2-isopropyloxy - 4 - aminophenyl)methane.

Our preferred diamines are m-phenylene diamine, 2,4-diaminotoluene, 2,4-diaminoanisole 4,4-diaminodiphenyl ether, 4,4'-diaminodiphenyl sulphoxide, bis(4-aminophenyl)methane and 2,2-bis(4-aminophenyl)propane.

While the large majority of our polyamides from simple diacid/diamine mixtures are amorphous, some may exhibit weak crystallinity. This is generally tolerable, but where wholly amorphous polyamides are desired, suitable modification may be effected by using a mixture of two or more of our specified dicarboxylic acids. Alternatively or additionally, the use of two or more of our specified diamines may achieve the same effect. Such mixtures may also be used to modify other properties, e.g. softening point, if desired.

Our invention also includes polyamides having macromolecular chains consisting of diamide units in which some of the residues of our specified diamines may be replaced by the residues of other aromatic diamines, particularly diaminodiphenyl sulphones, so long as insufficient of these are introduced to cause crystallinity and in any case the residues of the foreign diamine form less than 50% of the total number of diamine residues in the macromolecular chains. For example, mixtures of 4,4'-di-amino-diphenyl ether with 3,3'- or 4,4'-diaminodiphenyl sulphone may be used. Equally, some of our specified diacid residues may be replaced by residues of other aromatic diacids, particularly isophthalic acid, so long as insufficient of these are introduced to cause crystallinity and in any case the residues of the foreign diacid do not form more than 50% of the total number of diacid residues in the macromolecular chains; for example, isophthalic acid may be used with 4,4'-dicarboxydiphenyl ether. Also, if desired, aliphatic diacid and diamine residues may be introduced so long as not more than 10 mole percent of the diacid residues and not more than 10 mole percent of the diamine residues in the diamide units of the macromolecular chains are derived from aliphatic compounds.

Polyamides that are especially preferred because of their useful combination of physical and chemical properties are those obtained when the diacid is 4,4'-dicarboxydiphenyl ether and the diamine is 2,2-bis(4-aminophenyl)propane, 4,4'-diaminodiphenyl sulphoxide, 2,4-diaminoanisole or 2,4-diaminotoluene or where the diacid comprises a mixture of at least 50 mole % 4,4'-dicarboxydiphenyl other and up to 50 mole % isophthalic acid and the diamine is m-phenylene diamine; or where the diacid is a mono-$C_{1-6}$ alkoxy-isophthalic or -terephthalic acid or is 1,2-bis(4-carboxyphenoxy)ethane and the diamine is 4,4'-diaminodiphenyl ether, m-phenylene diamine, bis(4-aminophenyl)methane, 2,2-bis(4-aminophenyl)propane or mixtures of these. Other polyamides which are of particular interest are those derived from mixtures of 4,4'-diaminodiphenyl sulphone (or 3,3' - diaminodiphenyl sulphone) and 4,4' - diaminodiphenyl ether, the sulphone forming less than 50 mole % of the mixture, with 4,4'-dicarboxydiphenyl ether.

THE PROCESS

Our polymers may be prepared by any process for polycondensing the given classes of diamines and diacids. For example, a solution of the diamine in an organic solvent may be contacted in the presence of an acid acceptor with a solution of the diacid chloride in a second solvent immiscible with the first, polymerisation being effected at the interface. Less satisfactorily, the diacid may be heated with the diamine and the polyamide obtained directly or via the intermediate salt which may be formed initially when the reaction is effected in the presence of a little water.

While they are operable, both these processes have certain disadvantages where the preparation of our specified polyamides is concerned. For example, because of the nature of our copolymers, very high temperatures are required in melt reaction if products of high molecular weight are to be obtained and these may lead to thermal or oxidative degradation of the products. On the other hand, the interfacial technique is not very satisfactory when applied to some of our pairs of acids and amines. In general, therefore, we prefer to effect the polymerisation in solution in an organic compound which is liquid under the conditions of reaction, is a solvent for both the acid (in the form of acid halide) and amine components and has a swelling or at least partial solvation action on the polymeric product under the conditions of the reaction. This allows the polymerisation to be effected at only moderate temperatures (below 100° C., if desired), thereby avoiding decomposition or degradation of the products. Preferably, the reaction is effected in the presence of an acid acceptor which does not interfere with the polymerisation and which is also soluble in the chosen solvent. Such acid acceptors are well-known for polycondensation reactions and common examples are tertiary amines such as pyridine and inorganic salts of weak acids and strong bases. Where the organic acceptor is insoluble in the polymerisation solvent (e.g. as in the case of sodium carbonate) it may be supplied in solution in another solvent. In such cases it is sometimes preferable to add a surface active agent also. In many cases, water is acceptable as the solvent for the acid acceptor but the molecular weight of the product may be adversely affected unless a rapidly reacting combination of diacid and diamine is involved.

Organic compounds that may be used as solvents are generally highly polar in character. It is preferred to choose those in which the polymer remains in solution until a high molecular weight is achieved. Examples of suitable solvents are methyl ethyl ketone, acetonitrile, propionitrile, cyclic tetramethylene sulphone, 2,4-dimethyl cyclic tetramethylene sulphone, hexamethylphosphoramide, tetramethylurea, N,N-dialkylcarboxamide of aliphatic carboxylic acids containing at least two carbon atoms including carboxy carbon atoms, e.g. N,N-dimethylacetamide and N,N-dimethylpropionamide, and halogenated hydrocarbons containing at least two halogen atoms selected from chlorine and bromine, e.g. methylene chloride. N,N-dimethylacetamide is generally used.

When N,N-dialkylcarboxamides are used as solvents, no additional acid acceptor need be present.

In a preferred polymerisation procedure, the acid in the form of its dihalide is added to a solution of the amine or a salt thereof (e.g. the hydrochloride) in dimethylacetamide at low temperatures (generally about −20° C.), usually under an atmosphere of nitrogen, and the resultant solution is stirred vigorously. Polymerisation is effected rapidly at that temperature and the contents are stirred for about 15 minutes and then allowed to warm to room temperature, when they are stirred for a further 2–3 hours. The resultant polymer is recovered, e.g. by precipitation by pouring the solution into water.

The polymers of the invention are characterised by their generally amorphous nature; at most, they are only weakly crystalline or only weakly crystallisable as formed and are transparent. In general, they exhibit remarkably high softening points despite their lack of crystallinity and often show heat distortion temperatures of 200° C. or more. They are generally water-white in colour and may be moulded (e.g. by extruding or compression or injection moulding) and vacuum formed in conventional equipment for shaping thermoplastic materials. Alternatively, they may be dissolved in suitable solvents and transparent films, filaments or fibers may be obtained from the solutions. These films, filaments and fibres are drawable.

Our preferred polyamides are resistant to corrosive atmospheres both acid and alkaline, are substantially non-flammable and resist most forms of degradation; thermal, chemical or from radiation. In particular, they give transparent films and moulded parts which resist crazing on immersion in various organic solvents. These preferred polymers also show useful dielectric properties. Thus, in the form of film, they may be used as decorative trim, slot liners in electrical motors, insulation in transformers, capacitors, cables, etc; and as packaging for items to be exposed to radiation. They may also be moulded, e.g. into hot-water or corrosion resistant pipe or into containers. Solutions of the polymer may be used as varnishes and adhesives and for coating wire, fabric, etc. Fibres formed from the polymers, for example by spinning from solution, may be woven into fabric e.g. for making protective clothing or filters or may be formed into woven electrical sheathing.

The polymers of the invention may be mixed with additives such as heat and light stabilisers, lubricants, plasticisers, pigments, dyes, mould-release agents and fillers such as glass fibre, asbestos fibre, finely powdered metals or metal oxides, graphite, carbon black, ground glass and molybdenum disulphide, and may be blended with other polymeric materials, natural or synthetic.

The invention is now illustrated but in no way limited by the following examples in which all parts are expressed as parts by weight, and viscosity measurements, unless otherwise stated, are in 98% sulphuric acid at 25° C. In these examples, temperature-dependent tensile deformation tests were measured on a sample kept under a constant load and submitted to regular temperature increments of 20° C.; the samples are allowed to equilibrate with their surroundings between each stepwise temperature increment. Tensile tests at room temperature were measured on a Hounsfield Tensometer Type E using a rate of elongation of 1½ inches minute. In both cases, standard dog-bone samples having a neck 1″ long and ⅛″ wide were used.

Example 1

1.382 parts of 2:4-diaminoanisole (M.P. 63° C.; purified by repeated vacuum distillation from zinc dust) were dissolved in approximately 23.5 parts of pure, dry N,N-dimethylacetamide and the stirred solution was cooled to −20° C. 2.943 parts of the dichloride of 4,4′-dicarboxydiphenyl ether (M.P. 86–7° C.; recrystallised from dry petrol/benzene mixture) were then added to the stirred amine solution, the residues of the acid chloride being washed into the reaction flask with 9.3 parts of solvent. The temperature of the reaction mixture was maintained at −15° C. for 10 minutes and then allowed to rise to 23° C. Stirring was continued at this temperature for 3 hrs. after which the viscous solution was diluted with 47 parts of N,N-dimethylformamide and the polymer recovered by precipitation into 1000 parts of stirred distilled water. After washing with boiling water, followed by boiling methanol and then drying at 80° C. under vacuum for 16 hrs., 3.2 parts of polymer were obtained, having a reduced viscosity of 0.70.

0.005″ thick films cast from dimethylformamide solution and dried at 110° C. under vacuum were transparent with a degree of toughness, defined as the number of creasing cycles (i.e. folding through 180° C. and then back through 360°) which the film withstands before breaking at the crease line, of 6–8. On X-ray examination the polymer as prepared was found to be completely amorphous, as were samples of film annealed from 200° C. and drawn at 180° C.

Another 0.005″ film was prepared by compression moulding the dry polymer at 300° C. Samples of this film were examined in a tensile deformation test at a constant load of 264 lbs./sq. in. and increasing temperature. They showed 10% extension at 223° C. and 100% extension at 237° C. Samples of the same film examined in tensile tests at room temperature had a tensile yield stress of $8.8 \times 10^3$ lbs./sq. in. and a tensile modulus of $1.2 \times 10^5$ lbs./sq. in.

By way of comparison, if m-phenylene diamine replaces the 2,4-diaminoanisole crystallisable polymers are obtained which cannot be compression moulded satisfactorily.

Example 2

1.000 part of 4,4′-diaminodiphenyl ether was slurried in 133 parts of pure methylene chloride at 21° C. and stirred in a blender with 50 parts of an aqueous solution containing 1.0 part sodium carbonate and 0.05 part of sodium lauryl sulphate. To the emulsion so formed was added a solution of 1.16 parts of 2 - methoxyisophthalolyl chloride in 52 parts of methylene chloride. After 10 minutes stirring the precipitated product was filtered, washed with boiling water for 15 minutes then with hot methanol and dried at 80° C. under vacuum. 1.3 parts of polymer were obtained having a reduced viscosity of 0.69 and a softening point of 200–210° C.

The polymer was amorphous both as prepared and on annealing from 145° C. and could be compression moulded.

Example 3

2.48 parts of 4,4-diaminodiphenyl ether were reacted with 2.70 parts of methoxyterephthaloyl chloride using a similar technique to that in Example 2. 1.7 parts of sodium carbonate were added as acid acceptor and 0.1 part of sodium lauryl sulphate as emulsifying agent. After isolation and drying, 2.3 parts of polymer were obtained having a reduced viscosity of 0.51 and a softening point above 320° C. The polymer as prepared was almost completely amorphous on X-ray examination, and annealing from 250° C. did not increase the crystallinity.

In contrast, a polymer prepared by identical techniques from terephthaloyl chloride and 4,4′-diaminodiphenyl ether, of reduced viscosity 0.48 in sulphuric acid, was moderately crystalline on X-ray examination.

Example 4

2.12 parts of 4,4′-diaminodiphenyl ether were reacted as in Example 2 with 2.68 parts of n-propoxyterephthaloyl chloride (M.P. 42–3° C.) in the presence of 2.2 parts of sodium carbonate and 0.1 part of sodium lauryl sulphate. After filtration, washing and drying, 2.9 gms. of polymer, of reduced viscosity 1.40 in sulphuric acid, were obtained.

Transparent, solvent-cast films were obtained from a solution of the polymer in dimethylformamide. These had a degree of toughness of 5, an average tensile yield stress of $9.7 \times 10^3$ lbs./sq. in., an initial modulus of $3.1 \times 10^5$ lbs./sq. in. and an elongation to break of 3–5%. The film had a softening point of 285–90° C.

Samples of film each measuring 0.5 in. x 2 in. x 0.005 in. were immersed for 24 hours at room temperature in the following solvents; chloroform, petroleum ether (B. Pt. 60–80° C.), methanol, acetone, benzene, water, 5 N sulphuric acid and 0.1 N sodium hydroxide. After immersion, the samples were removed, dried in air and examined for toughness and surface crazing. No trace of surface crazing was found in any of the samples and they all retained their original degree of toughness.

Filaments and fibres could be spun from the dimethylformamide solution and drawn.

Example 5

1.063 parts of 4,4'-diaminodiphenyl ether were dissolved in 18.7 parts of pure dry dimethylacetamide and the solution was cooled to −20° C. 1.242 parts of 4-methoxyisophthaloyl chloride were then added in one portion, the residues being washed in with a total of 9.4 parts of solvent. After 5 minutes at −20° C., the solution was allowed to warm to 22° C. and stirred at this temperature for 3 hours. The product was isolated as described in Example 1 and after drying gave 1.9 gms. of polymer having a reduced viscosity of 0.54 in sulphuric acid.

X-ray examination showed very little crystallinity to be present and annealing from 200° C. failed to induce any further crystallisation.

A film cast from dimethyl formamide and dried at 150° C. under an absolute pressure of 0.1 mm. of mercury for 24 hours was clear, transparent and tough, (having a degree of toughness of 6). In an effort to induce crystallinity, strips of the film were drawn and immersed in formic acid at 95° C. while being held under tension. After treatment they were still found to be completely amorphous on X-ray examination.

In a heat distortion test at a constant load of 264 lbs./sq. in. the temperature at which 10% extension of a sample of the undrawn film was recorded was 232° C. 100% extension was reached at 270° C.

The average tensile yield strength of the cast film at 25° C. was $10.3 \times 10^3$ lbs./sq. in. and the average tensile modulus $8.1 \times 10^4$ lbs./sq. in.

Filaments and fibres could be spun from the dimethylformamide solution and drawn.

Example 6

2.268 parts of 2,2-bis(4-aminophenyl)propane were dissolved in 37.5 parts of redistilled dimethylacetamide and the solution cooled to −10° C. 2.958 parts of the diacid chloride of 4,4'-dicarboxydiphenyl ether were then added as described in Example 1 to the stirred solution which was then maintained at −10° C. for 5 minutes after which time the temperature of the reaction was allowed to rise to room temperature. The mixture was then stirred at this temperature for 2 hours. The polymer was then isolated by precipitation into distilled water and purified by washing in a high speed mixer with water followed by methanol. After drying at 110° C. under an absolute pressure of 0.2 mm. of mercury for 20 hours 4.2 parts of polymer having a reduced viscosity of 1.00 were obtained.

This polymer was soluble in warm dimethyl sulphoxide and films cast from this solution, after drying at 130° C. and an absolute pressure of 0.1 mm. of Hg for 48 hours, were strong, transparent and had a degree of toughness of 8–10. Strips of film could be drawn readily at about 200° C. and drawn samples treated with formic acid at 95° C. for 10 minutes while being held under light tension were completely amorphous on X-ray examination. Drawing a strip of film at 250° C. and annealing under tension from 300° C. also failed to induce any crystallinity in the oriented material.

A sample of dry film examined in a tensile deformation test under a load of 264 lbs./sq. in. showed a 10% extension at 281° C. and 100% extension at 286° C.

The dry polymer could be compression moulded at 310° C. to give strong, transparent films.

Example 7

2.323 parts of 4,4'-diaminodiphenyl sulphoxide (M.P. 175–6°) were reacted with 2.951 parts of the diacid chloride of Example 6 in 32.7 parts of dimethylacetamide under conditions described in Example 6.

After isolation, purification and drying, 4.3 parts of polymer having a reduced viscosity of 0.69 were obtained.

Transparent films with a degree of toughness of 7–8 could be cast from dimethylformamide solution and after drying at 150° C. and 0.5 mm. of Hg absolute pressure for 24 hours, examination in a tensile deformation test gave values of 286° C. and 287° C. for the temperatures of 10% and 100% extension.

Example 8

2.323 parts of 4,4'-diaminodiphenyl sulphoxide were reacted with 2.330 parts of 4-methoxyisophthaloyl chloride in a total volume of 32.7 parts of dimethylacetamide as described in Example 6. After isolation, purification and drying, 3.8 parts of polymer softening between 250° C. and 270° C. were obtained. The product rapidly formed an insoluble gel in concentrated sulphuric acid but dissolved readily in dimethylformamide, and reduced viscosities of 0.7 were obtained on these solutions.

Films cast from dimethylformamide solutions were transparent and strong, and had a degree of toughness of 1–2. Drawn samples of film after annealing from 150° C. were completely amorphous.

Example 9

1.982 parts of bis(4-aminophenyl)methane were reacted with 2.330 parts of 4-methoxyisophthaloyl chloride in a total volume of 28 parts of dimethylacetamide solution as described in Example 1. After isolation, purification and drying, 3.9 parts of polymer were obtained having a reduced viscosity of 0.38. Both the polymer as prepared and a sample annealed from 250° C. were completely amorphous on X-ray examination.

In contrast, a similar preparation using 2.034 parts of isophthaloyl chloride in place of the methoxyisophthaloyl chloride gave a polymer which after annealing from 250° C. was highly crystalline on X-ray examination.

Example 10

1.582 parts of 1,5-diaminonaphthalene were reacted with 2.332 parts of 4-methoxyisophthaloyl chloride in 28 parts of dimethylacetamide. The polymer precipitated as the acid chloride added and after the mixture was stirred at 20° C. for 2 hours, 2.9 parts of a polymer having a reduced viscosity of 0.20 and a softening point above 300° C. were obtained. Samples were amorphous as prepared and on annealing from 300° C.

Example 11

2.443 parts of 2,4-diaminotoluene were reacted with 5.902 parts of the diacid chloride of Example 6 in a total volume of 32.7 parts of dimethylacetamide as described in Example 1. 4.9 parts of a polymer of a reduced viscosity of 0.76 were obtained.

Fibres and films could be formed from solutions of the polymer in dimethylformamide. The films were transparent and tough (degree of toughness: 6–8). Strips of film drawn at temperatures of about 230° C. were completely amorphous on X-ray examination.

This polymer was readily compression moulded at 280° C. to give transparent, tough films. Its melt viscosity at 330° C. was measured as $45 \times 10^3$ poises at a shear rate of 1000 sec.$^{-1}$.

Amorphous products may also be obtained when the diacid chloride is replaced by that of para bis(4-carboxyphenoxy)benzene.

Example 12

1.091 parts of m-phenylene diamine were dissolved in 23.5 parts of dimethylacetamide and cooled to −5° C. A mixture of 1.472 parts of the diacid chloride of 4,4′-dicarboxydiphenyl ether and 1.023 parts of isophthaloyl chloride were added as in Example 6. 2.8 parts of dry polymer having a reduced viscosity of 1.03 were obtained.

Clear films having a degree of toughness of 5 were cast from dimethylformamide solutions and after drying at 140° C. under an absolute pressure of 0.1 mm. of Hg for 24 hours, these were examined in a tensile deformation test. Temperatures for 10% and 100% extension under a load of 264 lbs./sq. in. were 203° C. and 216° C. respectively.

A strip of film was drawn at 200° C. and held under light tension while immersed in formic acid at 95° C. for 10 mins. X-ray examination of this sample showed it to be completely amorphous.

Example 13

9.67 parts of 2,4-diaminoanisole were reacted with 20.66 parts of the diacid chloride of 4,4′-dicarboxydiphenyl ether in a total volume of 75 parts of N,N-dimethylacetamide under the conditions described in Example 1. After isolation, purification and drying, 22 parts of polymer having a reduced viscosity of 0.97 were obtained.

This polymer was extruded satisfactorily at 320° C., its melt viscosity being $7 \times 10^4$ poise at a shear stress of $10^{-7}$ dynes/cm.$^2$.

Fibres could be spun from solutions of the polymer in dimethylformamide and drawn.

Example 14

0.547 part of (50.5 mole percent) of m-phenylene diamine and 1.234 parts (49.5 mole percent) of 4,4′-diaminodiphenyl sulphone were dissolved in 23.5 parts of N,N-dimethylacetamide and the mixture was reacted under the conditions described in Example 1 with 2.955 parts of the diacid chloride of 4,4′-dicarboxydiphenyl ether. After isolation, 3.7 parts of a dry polymer having a reduced viscosity of 0.70 were obtained. At 350° C. the melt viscosity of the polymer was $8.5 \times 10^3$ poises, measured at a constant shear rate of 1000 sec.$^{-1}$.

Films cast from dimethylformamide were transparent and had a degree of toughness of 7–8. Strips of drawn film held under light tension in formic acid at 95° C. for ten minutes remained amorphous.

Dry cast film tested at room temperature showed an average yield stress of $9.5 \times 10^3$ lbs./sq. in. and an initial tensile modulus of $2.3 \times 10^5$ lbs./sq. in.

Repeat experiments in which up to 90 mole percent of the total diamine was m-phenylene diamine yielded amorphous polyamides.

We claim:

1. An amorphous or at most only weakly crystalline, thermally non-crystallizable, aromatic polyamide which is characterized by the absence of the property of undergoing on heating a first order phase transformation of melting from the solid crystalline condition to the wholly liquid state, said polyamide being formed of macromolecular chains consisting essentially of repeating aromatic diamide units derived from (a) at least one diamine and (b) at least one diacid in which the carboxylic acid groups are on non-adjacent carbon atoms, more than 50 and up to 100 mole percent of the diamine component being selected from the group consisting of:

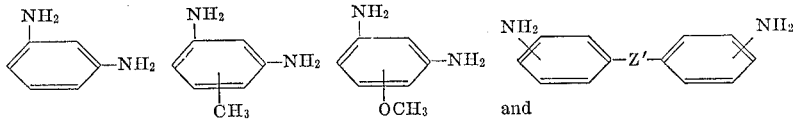

where Z′ is —O—, —SO—, —CH$_2$— or —C(CH$_3$)$_2$—, and less than 50 mole percent thereof is at least one bis-(aminophenyl) sulphone and from 50 to 100 mole percent of the diacid component is at least one diacid selected from the group consisting of monoalkoxyisophthalic acids in which the alkoxy groups have from 1 to 6 carbon atoms, monoalkoxyterephthalic acids in which the alkoxy groups have from 1 to 6 carbon atoms, dicarboxydiphenyl ethers and bis(carboxyphenoxy) benzenes and from 0 to 50 mole percent thereof is isophthalic acid, the diamide units in no instance being exclusively of a structure selected from the group consisting of

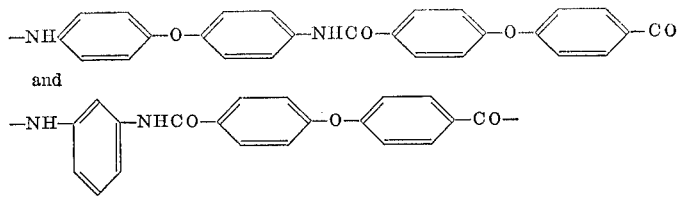

and mixtures thereof.

2. A polyamide according to claim 1 in which the diamine is selected from the group consisting of 4,4′-diaminodiphenyl ether, 4,4′-diaminodiphenyl sulphoxide, bis(4-aminophenyl)methane and 2,2-bis(4-aminophenyl) propane.

3. A polyamide according to claim 1, in which the diacid is 4,4′-dicarboxydiphenyl ether and the diamine is selected from the group consisting of 2,2-bis(4-aminophenyl)propane, 4,4′-diaminodiphenyl sulphoxide, 2,4-diaminoanisole and 2,4-diaminotoluene.

4. A polyamide according to claim 1 in which the diacid component is at least one diacid selected from the group consisting of monoalkoxyisophthalic acids and monoalkoxyterephthalic acids wherein the alkoxy groups contain from 1 to 6 carbon atoms and 1,2-bis(4-carboxyphenoxy) ethane and the diamine component is at least one diamine selected from the group consisting of 4,4′-diaminodiphenyl ether, m-phenylene diamine, bis(4-aminophenyl)methane and 2,2 - bis(4-aminophenyl)propane.

5. A polyamide according to claim 1 in which the diamine is 4,4′-diaminodiphenyl ether and the acid is selected from the group consisting of 2-methoxyisophthalic acid, methoxyterephthalic acid and n-propoxyterephthalic acid.

6. A polyamide according to claim 1 in which the diacid is 4-methoxyisophthalic acid and the diamine is selected from the group consisting of 4,4′-diaminodiphenyl ether, 4,4′-diaminodiphenyl sulphoxide and bis(4-aminophenyl)methane.

7. A polyamide according to claim 1 in which the diamine component is (a) a diamine selected from m-phenylene diamine and 4,4′-diaminophenyl ether and (b) 4,4′-diaminodiphenyl sulphone, and the diacid is (c) 4,4′-dicarboxydiphenyl ether.

8. A polyamide according to claim 1 in which the diacid is a mixture of at least 50 mole percent but less than 100 mole percent of 4,4'-dicarboxyphenyl ether and up to 50 mole percent of isophthalic acid and the diamine is m-phenylene diamine.

9. A polyamide according to claim 1 having a reduced viscosity, measured in a solution of 1 gm. of polymer in 100 cc. of 98% sulphuric acid at 25° C. of from 0.3 to 2.0.

10. A melt-shaped article formed from a polyamide according to claim 1.

11. A film formed from a polyamide according to claim 1.

12. A filament formed from a polyamide according to claim 1.

13. A coated base wherein the coating is derived from a polyamide according to claim 1.

14. A solution of a polyamide according to claim 1 in a solvent therefor.

References Cited

UNITED STATES PATENTS

| 3,063,966 | 11/1962 | Kwolek et al. | 260—78 |
| 3,094,511 | 6/1963 | Hill et al. | 260—78 |

WILLIAM SHORT, Primary Examiner

L. L. LEE, Assistant Examiner

U.S. Cl. X.R.

117—128.4, 138.8, 161; 174—124; 260—30.8, 32.6, 37, 49, 65, 78; 310—215; 336—219